(12) United States Patent
Kuan (10) Patent No.: US 9,188,365 B2
(45) Date of Patent: Nov. 17, 2015

(54) FRAME FOR SUPPORTING SOLAR MODULE

(71) Applicant: AU OPTRONICS CORP., Hsinchu (TW)

(72) Inventor: Hao-Hung Kuan, Hsin-Chu (TW)

(73) Assignee: AU OPTRONICS CORP., Hsinchu (TW)

( * ) Notice: Subject to any disclaimer, the term of this patent is extended or adjusted under 35 U.S.C. 154(b) by 0 days.

(21) Appl. No.: 14/294,497

(22) Filed: Jun. 3, 2014

(65) Prior Publication Data

US 2014/0360111 A1    Dec. 11, 2014

(30) Foreign Application Priority Data

Jun. 5, 2013    (CN) .......................... 2013 1 0220872

(51) Int. Cl.
  *F24J 2/52*     (2006.01)
  *H01L 31/042*   (2014.01)
(52) U.S. Cl.
  CPC .............. *F24J 2/5205* (2013.01); *Y02E 10/47* (2013.01); *Y02E 10/50* (2013.01)
(58) Field of Classification Search
  CPC ........ E04B 2/797; Y02B 10/12; Y02B 10/20; H02S 20/10; H02S 20/20; H02S 20/22; H02S 20/23; H02S 20/24; Y02E 10/47; F24J 2/5203; F24J 2/5205; F24J 2/5233; F24J 2/5252; F24J 2/5254; F24J 2002/522
  See application file for complete search history.

(56) References Cited

U.S. PATENT DOCUMENTS

| | | | | |
|---|---|---|---|---|
| 2,138,291 | A * | 11/1938 | Callaghan | 52/290 |
| 3,845,601 | A * | 11/1974 | Kostecky | 52/290 |
| 4,479,737 | A * | 10/1984 | Bergh et al. | 403/382 |
| 5,394,665 | A * | 3/1995 | Johnson | 52/241 |
| 7,850,390 | B2 * | 12/2010 | Lisbona | 403/382 |
| 8,495,997 | B1 * | 7/2013 | Laubach | 126/680 |
| 2002/0189192 | A1 | 12/2002 | Becker et al. | |
| 2008/0054134 | A1 | 3/2008 | Shafer et al. | |
| 2010/0275548 | A1 * | 11/2010 | Wright | 52/653.1 |
| 2011/0056155 | A1 * | 3/2011 | Dollerup | 52/204.2 |
| 2012/0234310 | A1 * | 9/2012 | Wallgren | 126/571 |
| 2013/0032208 | A1 * | 2/2013 | Walz et al. | 136/259 |
| 2014/0083504 | A1 | 3/2014 | Kuo | |

FOREIGN PATENT DOCUMENTS

| | | |
|---|---|---|
| CH | 704061 A2 * | 5/2012 |
| CN | 1392315 | 1/2003 |
| CN | 201956545 | 8/2011 |
| CN | 202067795 | 12/2011 |

(Continued)

*Primary Examiner* — Christine T Cajilig
(74) *Attorney, Agent, or Firm* — WPAT, PC; Justin King (57) ABSTRACT

A frame for supporting a solar module is disclosed. The frame includes a bar base and a first support. The bar base has at least two positioning holes. The first support is utilized for being engaged with the bar base. The first support includes two first sidewalls, two first extension portions, and a first top plate. Each of the first sidewalls has a first opening. Each of the first extension portions extends from an edge of the corresponding first opening toward an interior of the first support. An angle is included between each of the first extension portions and the corresponding first sidewall. The first top plate is disposed on top of the first sidewalls. Each of the first extension portions is trapped in the corresponding positioning hole when the first support is engaged with the bar base.

17 Claims, 9 Drawing Sheets

(56) References Cited

FOREIGN PATENT DOCUMENTS

| | | | | |
|---|---|---|---|---|
| CN | 202307938 | | 7/2012 | |
| CN | 102903772 | | 1/2013 | |
| DE | 102008057276 | * | 5/2010 | ............ H01L 31/042 |
| EP | 1619727 A2 | * | 1/2006 | ................. F24J 2/52 |
| EP | 1604407 | | 7/2009 | |
| EP | 2402679 A2 | * | 1/2012 | |
| TW | 552340 | | 9/2003 | |
| TW | M323239 | | 12/2007 | |
| TW | M382471 | | 6/2010 | |
| TW | M442989 | | 12/2012 | |
| WO | WO 02073703 A1 | * | 9/2002 | |
| WO | 2008/118518 | | 10/2008 | |
| WO | WO 2011054943 A1 | * | 5/2011 | |
| WO | WO 2012023306 A1 | * | 2/2012 | |

* cited by examiner

FRAME FOR SUPPORTING SOLAR MODULE

RELATED APPLICATIONS

This application claims priority to China Application Serial Number 201310220872.4, filed Jun. 5, 2013, which is herein incorporated by reference.

BACKGROUND

1. Field of Invention

The present invention relates to a solar module. More particularly, the present invention relates to a frame for a solar module.

2. Description of Related Art

In recent years, world attention has focused on energy issues because worldwide crude oil reserves have been decreasing year by year. In order to solve the energy depletion crisis, the development and exploitation of various alternative energies have become matters of vital importance. Solar energy has the advantages of generating no pollution and being inexhaustible. Together with increasing environmental awareness, these factors have been such that solar energy has attracted the most attention among all related fields. Hence, more and more solar modules have been installed on roofs of buildings, in city squares, and at other places that receive much sunlight.

Most solar modules must be joined on frames before they are fixed on the roofs of buildings. As a result, simplifying the tools used and steps required for the installation of solar modules have become important factors in improving the assembly efficiency of solar modules.

SUMMARY

An assembly frame for a solar module that enables fast assembly is provided.

The frame utilized for supporting a solar module comprises a bar base and a first support. The bar base has at least two positioning holes. The first support is utilized for being engaged with the bar base. The first support comprises two first sidewalls, two first extension portions, and a first top plate. Each of the first sidewalls has a first opening. Each of the first extension portions extends from an edge of the corresponding first opening toward an interior of the first support. An angle is included between each of the first extension portions and the corresponding first sidewall. The first top plate is disposed on top of the first sidewalls. Each of the first extension portions is trapped in the corresponding positioning hole when the first support is engaged with the bar base.

In the foregoing, the first support further comprises a first connection portion connected to the first sidewalls and the first top plate. The first connection portion has a plurality of first recesses. Each of the first recesses is formed in the first connection portion where the first connection portion is connected to one of the first sidewalls. The first recesses are utilized for engaging with the bar base.

In the foregoing, the first top plate has an inclination angle relative to a bottom edge of each of the first sidewalls.

In the foregoing, the first support further comprises a first bending portion connected to one side of the first top plate.

In the foregoing, the angle between each of the first extension portions and the corresponding first sidewall is between about 5 degrees and about 30 degrees.

In the foregoing, a width of the first top plate is greater than an interval between the two first sidewalls.

In the foregoing, each of two end portions of the first top plate extending beyond one of the first sidewalls has a bolt opening.

In the foregoing, the bar base includes a bottom plate, and two ribs standing upright on the bottom plate. The positioning holes are formed on the ribs.

In the foregoing, the frame further comprises a second support. The second support comprises a second top plate, two second sidewalls, and two second extension portions. The second sidewalls are connected to two opposite sides of the second top plate. A height of the second sidewalls is greater than a height of the first sidewalls. Each of the second sidewalls has a second opening. Each of the second extension portions extends from one of the second sidewalls toward an interior of the second support. A top end of each of the second extension portions abuts against a top edge of the corresponding positioning hole when the second support is engaged with the bar base.

In the foregoing, the second support further comprises a second connection portion connected to the second sidewalls and the second top plate. The second connection portion has a plurality of second recesses. Each of the second recesses is formed in the second connection portion where the second connection portion is connected to one of the second sidewalls. The second recesses are utilized for engaging with the bar base.

In the foregoing, the bar base comprises a bottom plate and two ribs standing upright on the bottom plate. The positioning holes are disposed in the ribs.

In the foregoing, the second top plate has an inclination angle relative to a bottom surface of the second sidewall.

In the foregoing, the second support further comprises a second bending portion connected to one side of the second top plate.

In the foregoing, an angle is included between each of the second extension portions and the corresponding second sidewall, and the angle is between about 5 degrees and about 30 degrees.

In the foregoing, the second support further comprises a plurality of ear-hook portions disposed on the second sidewalls, and the frame further comprises a wind deflector hooked on the ear-hook portions.

In the foregoing, a width of the second top plate is greater than an interval between the two second sidewalls.

In the foregoing, each of two end portions of the second top plate extending beyond the second sidewall has a bolt opening.

In the foregoing, the frame further comprises a counterweight receiving member. The counterweight receiving member has a strip hole to allow the counterweight receiving member to engage with the bar base.

Since the first support and the second support are directly engaged with the bar base, no screw or other holding fixtures are necessary. Hence, the number of assembly procedures is effectively reduced to improve assembly efficiency.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1A:
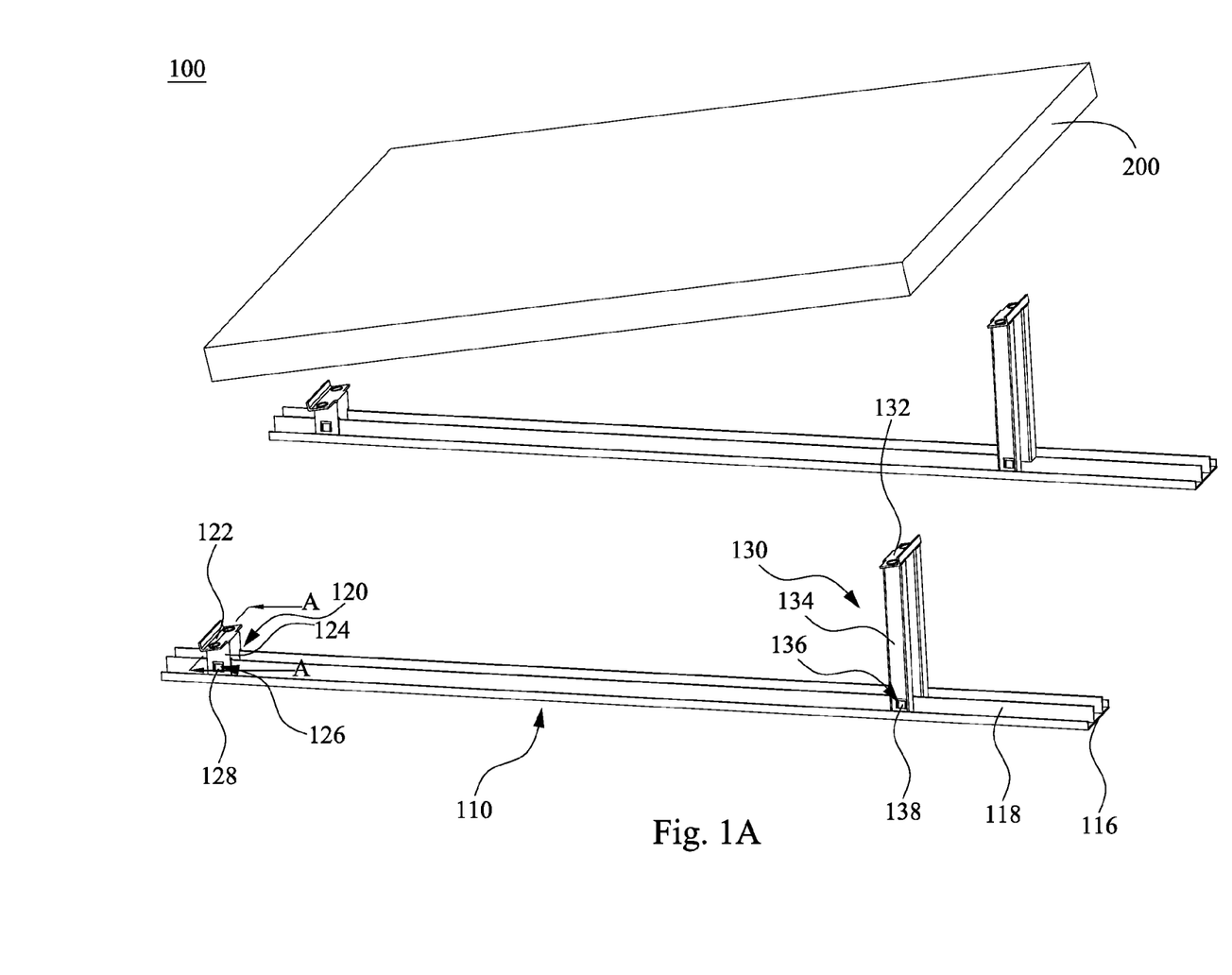
FIG. 1A and FIG. 1B are respectively a perspective view and an exploded view of a frame utilized for fixing a solar module according to an embodiment of the present invention.
Figure 1B:
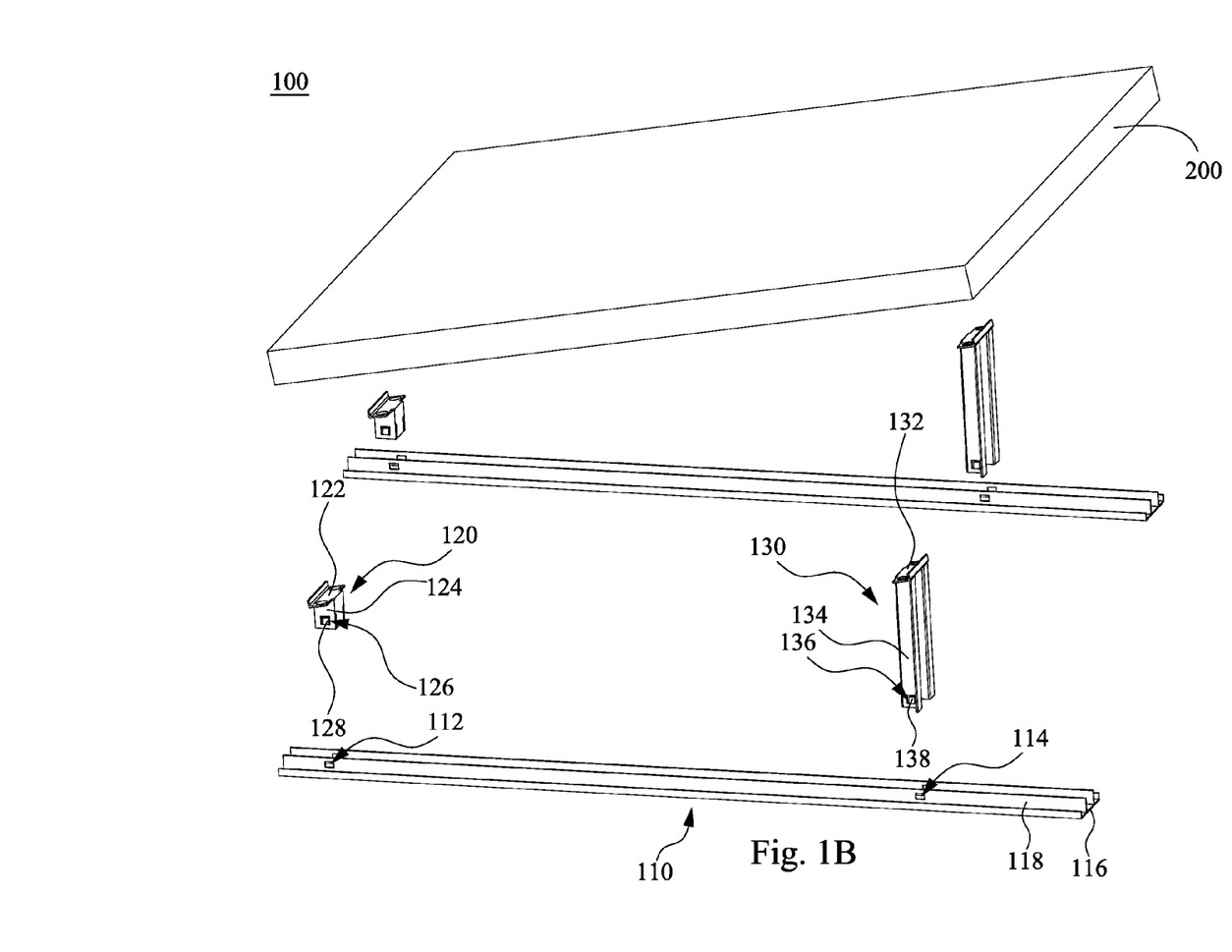

FIG. 1A and FIG. 1B are respectively a perspective view and an exploded view of a frame utilized for fixing a solar module according to an embodiment of the present invention. The frame 100 comprises a bar base 110, a first support 120, and a second support 130. The bar base 110 may be utilized for being fixed to the roof of a buildings or on the ground. The first support 120 and the second support 130 are first engaged with the bar base 110, and then the solar module 200 is fixed on the first support 120 and the second support 130. In order to simplify the tools and steps required for assembly, the first support 120 and the second support 130 are engaged with or interlock to the bar base 110 when the frame 100 is assembled. Hence, screw tightening is not required. Through such a configuration, not only assembly efficiency is improved, but structural strength is also achieved.

In greater detail, the bar base 110 has two first positioning holes 112. The first support 120 comprises a first top plate 122, two first sidewalls 124 connected to two opposite sides of the first top plate 122, and two first extension portions 128. With additional reference to FIG. 2, each of the first sidewalls 124 has a first opening 126. Each of the first extension portions 128 extends from an edge of the corresponding first opening 126 toward an interior of the first support 120, and a predetermined angle θ is formed between each of the first extension portions 128 and the corresponding first sidewall 124. Hence, the first extension portion 128 extends from the first sidewall 124, but is not coplanar with the first sidewall 124. With this configuration, when the first support 120 is engaged with the bar base 110, each of the first extension portions 128 extends into the corresponding first positioning hole 112 and abuts against an edge of the corresponding first positioning hole 112 so as to trap the first extension portions 128 in the corresponding first positioning hole 112 and position the first support 120 on the bar base 110.

The bar base 110 further comprises two second positioning holes 114. The second support 130 comprises a second top plate 132, two second sidewalls 134 connected to two opposite sides of the second top plate 132, and two second extension portions 138. Each of the second sidewalls 134 has a second opening 136. Each of the second extension portions 138 extends from an edge of the corresponding second opening 136 toward an interior of the second support 130, and a predetermined angle (such as the predetermined angle θ shown in FIG. 2) is formed between each of the second extension portions 138 and the corresponding second sidewall 134. Hence, the second extension portion 138 extends from the second sidewall 134, but is not coplanar with the second sidewall 134. With this configuration, when the second support 130 is engaged with the bar base 110, each of the second extension portions 138 extends into the corresponding second positioning hole 114 and abuts against an edge of the corresponding second positioning hole 114 so as to trap the second extension portions 138 in the corresponding second positioning hole 114 and position the second support 130 on the bar base 110.

The bar base 110 comprises a bottom plate 116 and two ribs 118 standing upright on the bottom plate 116. The ribs 118 are parallel with each other. The first positioning holes 112 and the second positioning holes 114 are formed in the ribs 118. The first support 120 and the second support 130 are directly engaged with the ribs 118 of the bar base 110. As a result, screws or other holding fixtures are not necessary so that the number of assembly procedures is effectively reduced thereby assembly efficiency is improved.

The first support 120 and the second support 130 may have the same height or different heights. In the present embodiment, the height of the second support 130 is greater than the height of the first support 120, which allows the solar module 200 to have an inclination angle when the solar module 200 is placed on the frame 100.

The positions of the first positioning holes 112 and the second positioning holes 114 in the bar base 110 may be determined based on the size of the solar module 200. In other words, when designing the bar base 110, a distance between the first positioning holes 112 and the second positioning holes 114 may be determined based on the size of the solar module 200 to be supported by the frame 100, or stated in yet another way, the distance between the first positioning holes 112 and the second positioning holes 114 is a predetermined distance corresponding to a length of the solar module 200. By customizing the bar base 110 in this manner, the time necessary for positioning the solar module 200 can be further minimized.

In the present embodiment, a set of the first positioning holes 112 are disposed to accommodate the first support 120 and a set of the second positioning holes 114 are disposed to accommodate the second support 130. However, in practice, a plurality of sets of the first positioning holes 112 and a plurality of sets of the second positioning holes 114 may be formed in the bar base 110 to provide more flexibility with respect to the positioning of the first support 120 and the second support 130.

Figure 2:
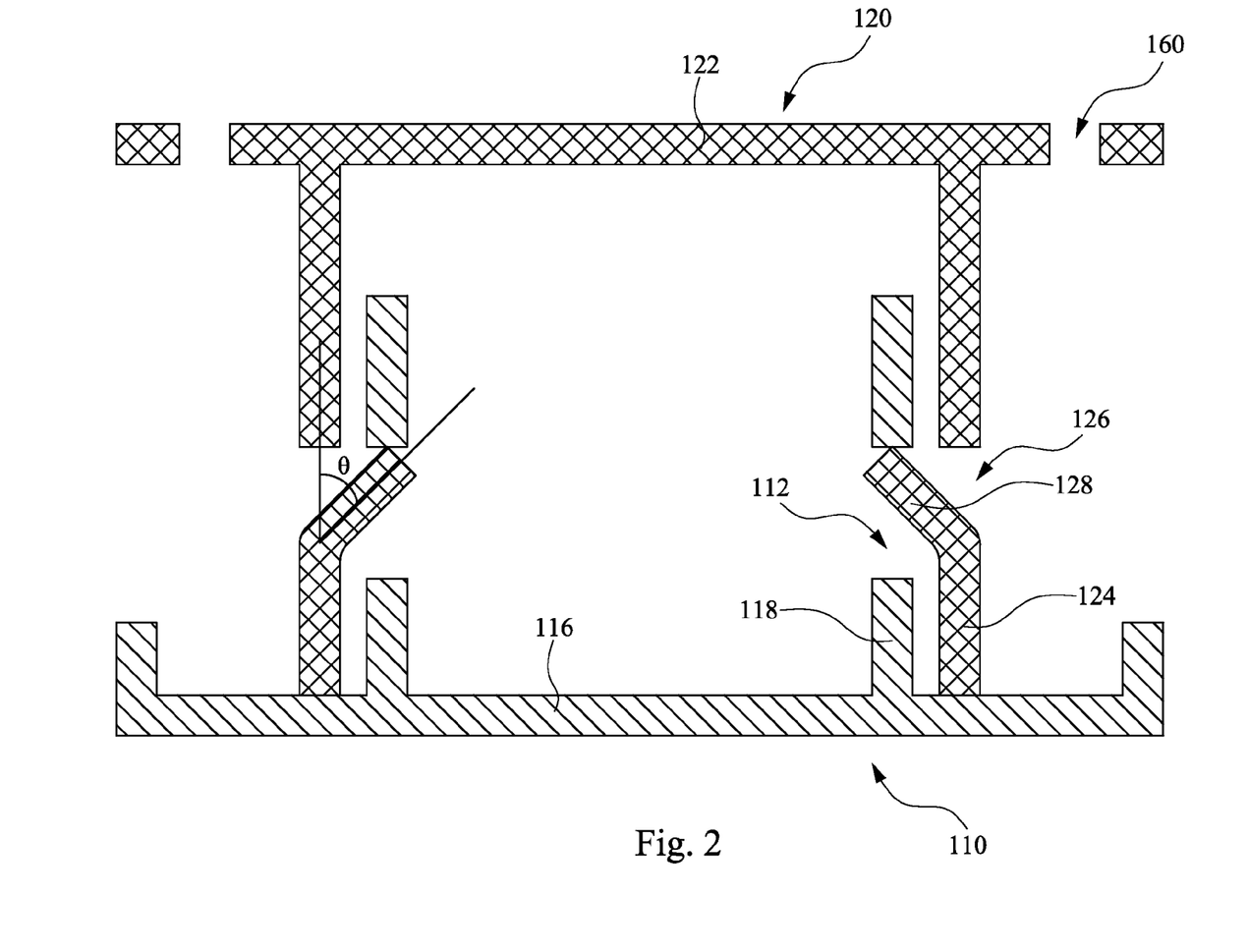
FIG. 2 is a cross-sectional view of the frame taken along line A-A in FIG. 1A.

FIG. 2 is a cross-sectional view of the frame 100 taken along line A-A in FIG. 1A. The bar base 110 comprises the bottom plate 116 and the two ribs 118 standing upright on the bottom plate 116. The first positioning holes 112 are formed in the ribs 118. The first support 120 comprises the first top plate 122 and the two first sidewalls 124 connected to the two opposite sides of the first top plate 122. The first openings 126 are formed in the first sidewalls 124. The first extension portions 128 extend from the first sidewalls 124 toward the interior of the first support 120, and the predetermined angle θ is formed between the first extension portions 128 and the first sidewalls 124. Hence, the first extension portions 128 extend from the first sidewall 124, but are not coplanar with the first sidewalls 124. In some embodiments, the first extension portions 128 and the first sidewalls 124 are integrally formed and each of the first extension portions 128 is formed by a punch process. An interval between the two first sidewalls 124 is a little greater than an interval between the two ribs 118 to allow the first support 120 to tightly engage with the ribs 118.

A width of the first top plate 122 of the first support 120 is greater than the interval between the two first sidewalls 124. The first top plate 122 is utilized for supporting the solar module 200 shown in FIG. 1A. The first top plate 122 has bolt openings 160 so that the solar module 200 can be fastened to the first support 120 by inserting bolts into the bolt openings 160 and engaging the bolts with the solar module 200.

In some embodiments, the first support 120 is made of metal with enough elasticity so that the first extension portions 128 flips back slightly when pressed and restores to their original state when the pressing force is released. Then, the first extension portion 128 enters into and is trapped in the first positioning holes 112 when the first support 120 is engaged with the bar base 110. In this state where the first support 120 is engaged with the bar base 110, a top end of each of the first extension portions 128 abuts against an edge of the corresponding first positioning hole 112. As a result, the first support 120 is firmly fixed on the bar base 110 because of the weight of the solar module 200 exerting on the first support 120.

In order to allow the first extension portions 128 to enter into the first positioning holes 112 without being deformed permanently, the angle θ between each of the first extension portions 128 and the corresponding first sidewall 124 is preferably between about 5 degrees and about 30 degree.

Since the second support 130 is engaged with the bar base 110 in the same manner as that in which the first support 120 is engaged with the bar base 110, a further description in this regard is not provided.

Figure 3A:
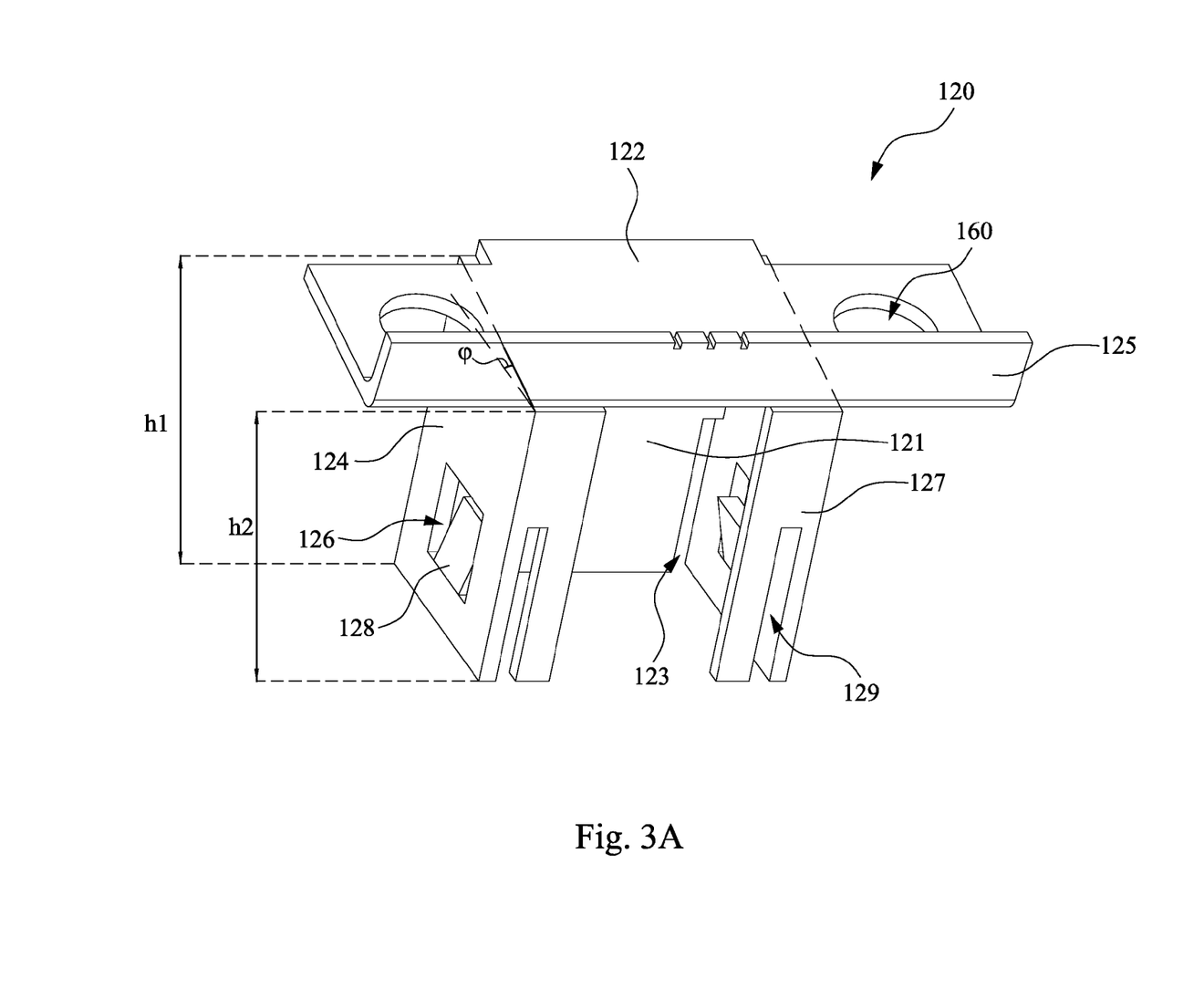
FIG. 3A and FIG. 3B are respectively a perspective view and a side view of a first support of the frame according to an embodiment of the present invention.
Figure 3B:
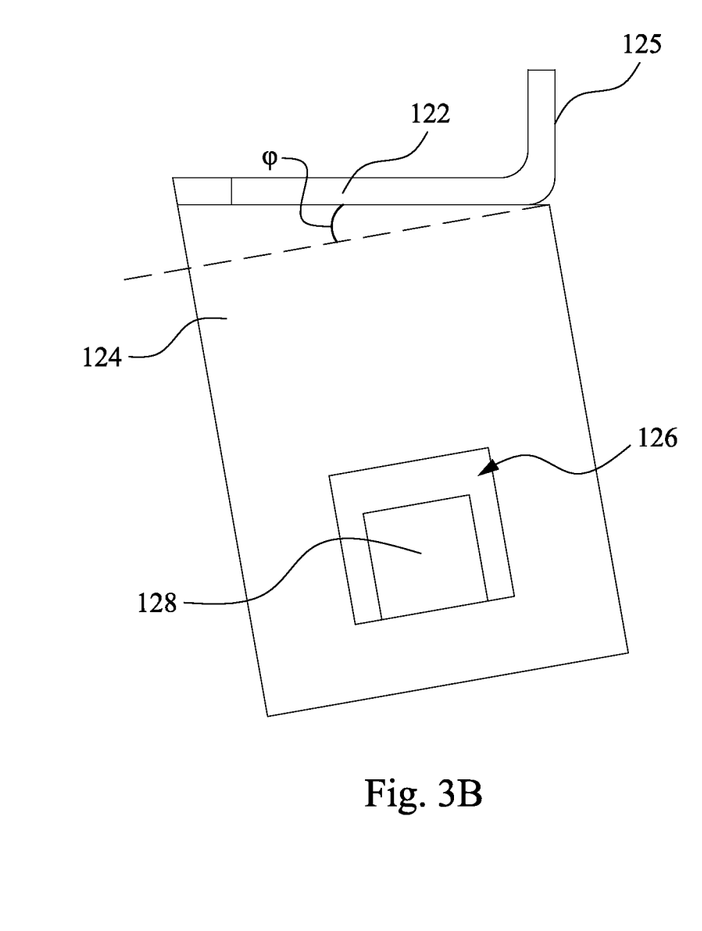

FIG. 3A and FIG. 3B are respectively a perspective view and a side view of the first support 120 of the frame 100 according to an embodiment of the present invention. The first support 120 comprises the first top plate 122, the first sidewalls 124 connected to the first top plate 122, and the first extension portions 128. Each of the first sidewalls 124 has the first opening 126. The corresponding first extension portion 128 extends from the edge of the first opening 126 toward the interior of the first support 120, and the predetermined angle θ (see FIG. 2) is formed between the first extension portion 128 and the first sidewall 124. Hence, the first extension portion 128 extends from the first sidewall 124, but is not coplanar with the first sidewall 124.

The first support 120 may selectively comprise a first connection portion 121 to further improve the structural strength of the first support 120. The first connection portion 121 connects to the first sidewalls 124 and the first top plate 122. The first connection portion 121 has a plurality of first recesses 123 to enable the engagement of the first support 120 with the bar base 110. Each of the first recesses 123 is formed on one side of the first connection portion 121 adjacent to one of the first sidewalls 124. When the first support 120 is engaged with the bar base 110 (see FIG. 1B), each of the first recesses 123 and the corresponding rib 118 fit together (see FIG. 1B). Hence, an opening length of the first recesses 123 is approximately equal to a height of the ribs 118. The first support 120 further selectively comprises two second connection portions 127. Each of the second connection portions 127 connects to one of the first sidewalls 124 and the first top plate 122, and the two second connection portions 127 are located at opposite sides of the first connection portion 121 and are approximately parallel to each other. The second connection portions 127 further improve the structural strength of the first support 120. Furthermore, each of the second connection portions 127 has a second recess 129. The second recesses 129 are opposite respectively to the first recesses 123 and are utilized for fitting with the rib 118 of the bar base 110.

In the first support 120, a height h1 of the first connection portion 121 is greater than a height h2 of the second connection portions 127. Hence, a top edge and a bottom edge of each of the first sidewalls 124 are not parallel with each other. A predetermined angle φ is formed between the top edge and the bottom edge of the first sidewall 124, and the predetermined angle φ may be set as the desired angle of the solar module 200 relative to the ground or a building after the solar module 200 is installed. If the bottom edge of the first sidewall 124 is horizontal, then the top edge of the first sidewall 124 connected to the first top plate 122 is oblique. In other words, the first sidewall 124 is in a roughly trapezoidal shape so that the first top plate 122 disposed on top of the first sidewall 124 has an inclination angle φ relative to the bottom edge of the first sidewall 124.

The first top plate 122 further comprises a first bending portion 125 connected to a side of the first top plate 122. The first bending portion 125 is substantially perpendicular to the first top plate 122. A width of the first top plate 122 is greater than the interval between the two first sidewalls 124, and each of two end portions of the first top plate 122 extending beyond the first sidewall 124 has the bolt opening 160. The first bending portion 125 is disposed on the side of the first top plate 122 having the smaller height, which is the side adjacent to the second connection portions 127. Consequently, the first top plate 122 and the first bending portion 125 can provide support to the solar module 200 (see FIG. 1A) after it is placed on the first support 120, and the solar module 200 is fastened to the first support 120 by inserting bolts into the bolt openings 160 and engaging the bolts with the solar module 200.

Figure 4A:
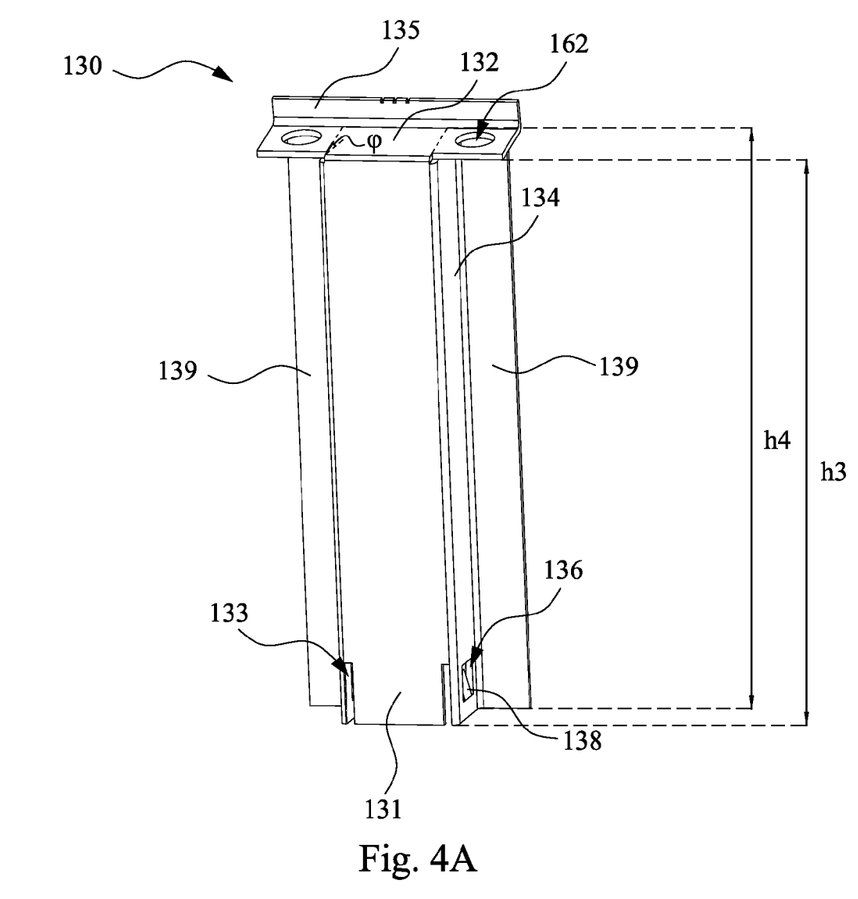
FIG. 4A and FIG. 4B are respectively a perspective view and a side view of a second support of the frame according to an embodiment of the present invention.
Figure 4B:
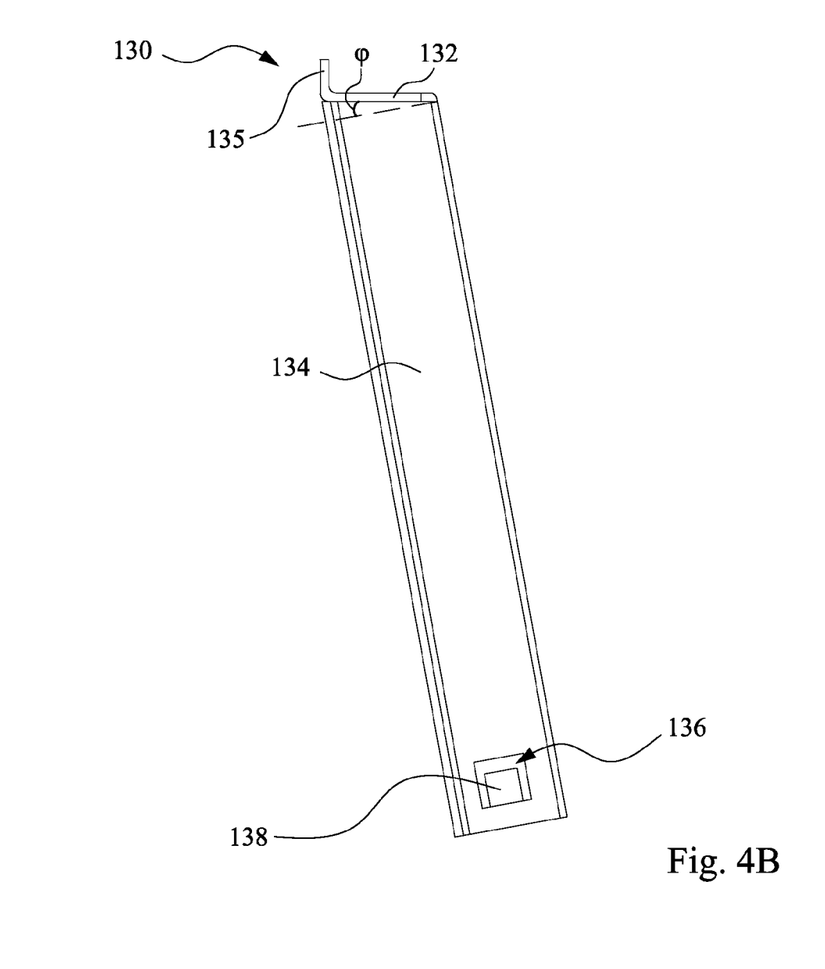

FIG. 4A and FIG. 4B are respectively a perspective view and a side view of one of the second supports 130 of the frame 100 according to an embodiment of the present invention. The second support 130 comprises the second top plate 132, the two second sidewalls 134 connected to the second top plate 132, and the two second extension portions 138. Each of the second sidewalls 134 has the second opening 136. The corresponding second extension portion 138 extends from the edge of the second opening 136 toward the interior of the second support 130, and the predetermined angle is formed between the second extension portion 138 and the second sidewall 134. Hence, the second extension portion 138 extends from the second sidewall 134, but is not coplanar with the second sidewall 134. In some embodiments, the second extension portion 138 and the second sidewall 134 are integrally formed and formed by a punch process.

The second support 130 may selectively comprise a third connection portion 131 to further improve the structural strength of the second support 130. The third connection portion 131 connects to the second sidewalls 134 and the second top plate 132. The third connection portion 131 has a plurality of third recesses 133 to enable the engagement of the second support 130 with the bar base 110 (see FIG. 1B). Each of the third recesses 133 is formed on one side of the third connection portion 131 adjacent to one of the second sidewalls 134. When the second support 130 is engaged with the bar base 110, each of the third recesses 133 and the corresponding rib 118 fit together (see FIG. 1B). Hence, an opening length of the third recesses 133 is approximately equal to the height of the ribs 118. The second support 130 further selectively comprises two fourth connection portions 139 on both sides of the second top plate 132. Each of the fourth connection portions 139 connects to one of the second sidewalls 134 and the second top plate 132. According to the present embodiment, the fourth connection portion 139 extends outwardly from the second sidewall 134 so as to further improve the structural strength of the second support 130.

A height h3 of the third connection portion 131 is smaller than a height h4 of the fourth connection portions 139 on the other side of the second top plate 132. Hence, a top edge and a bottom edge of each of the second sidewalls 134 are not parallel with each other. A predetermined angle φ is formed between the top edge and the bottom edge of the second sidewall 134, and the predetermined angle φ may be set as the desired angle of the solar module 200 relative to the ground or a building after the solar module 200 is installed. If the bottom edge of the second sidewall 134 is horizontal, then the top edge of the second sidewall 134 connected to the second top plate 132 is oblique. In other words, the second sidewall 134 is in a roughly trapezoidal shape so that the second top plate 132 disposed on top of the second sidewall 134 has an inclination angle φ relative to the bottom edge of the second sidewall 134.

The second top plate 132 further comprises a second bending portion 135 connected to a side where the second top plate 132 is connected to the fourth connection portions 139. The second bending portion 135 is substantially perpendicular to the second top plate 132. More specifically, the second bending portion 135 is disposed on the side of the second top plate 132 having the greater height h4. In addition, another difference between the second support 130 and the first support 120 is that an overall height of the second support 130 is greater than that of the first support 120. In other words, the height h3 of the second sidewall 134 is greater than the height h1 of the first sidewall 124 so that the solar module 200 disposed on the second support 130 has the inclination angle.

A width of the second top plate 132 is greater than an interval between the two second sidewalls 134, and each of two end portions of the second top plate 132 extending beyond the second sidewall 134 has a bolt opening 162. The second bending portion 135 is disposed on the side of the second top plate 132 which is higher than the other side, and is adjacent to the fourth connection portions 139. Consequently, the second top plate 132 and the second bending portion 135 can provide support to the solar module 200 (see FIG. 1A) after it is placed on the second support 130, and the solar module 200 is fastened to the second support 130 by inserting bolts into the bolt openings 162 and engaging the bolts with the solar module 200.

Figure 5A:
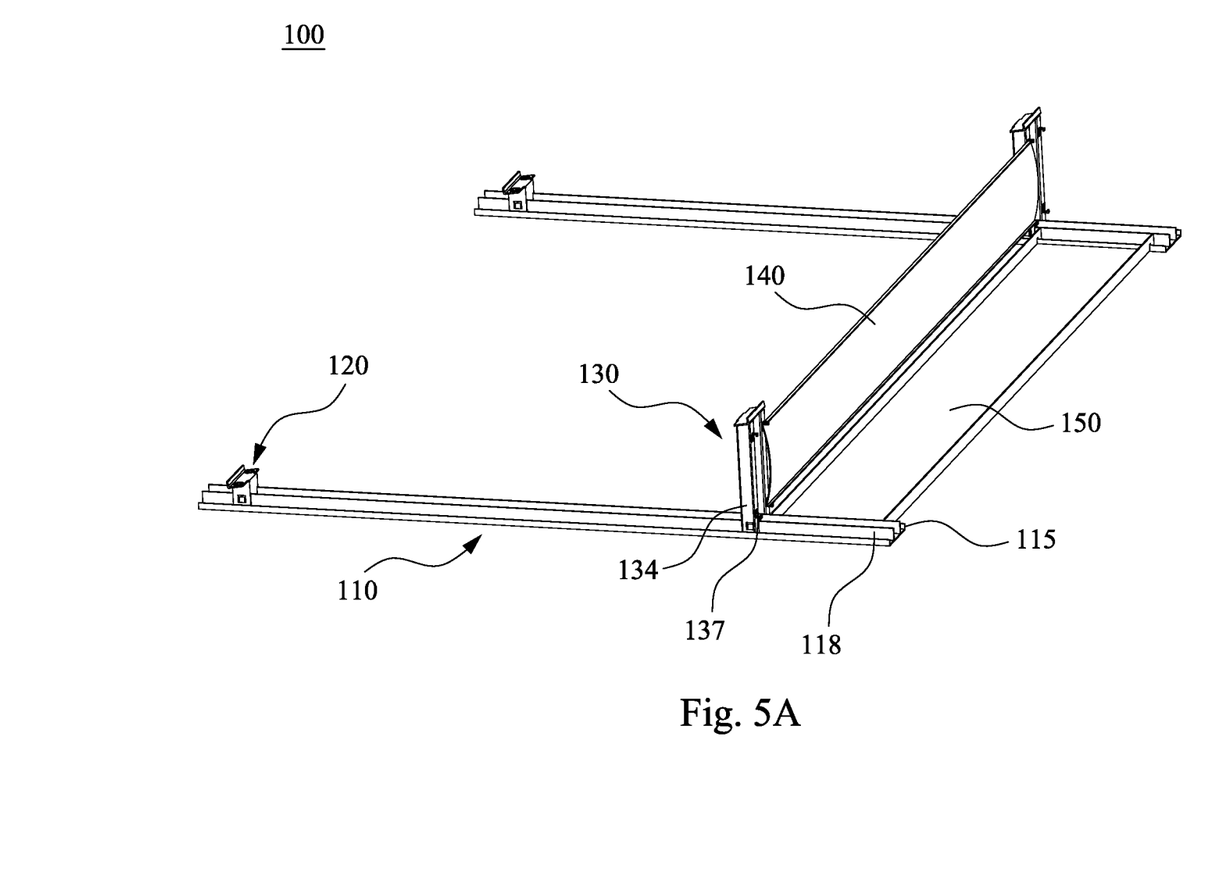
FIG. 5A and FIG. 5B are respectively a perspective view and an exploded view of a frame utilized for fixing a solar module according to another embodiment of the present invention.
Figure 5B:
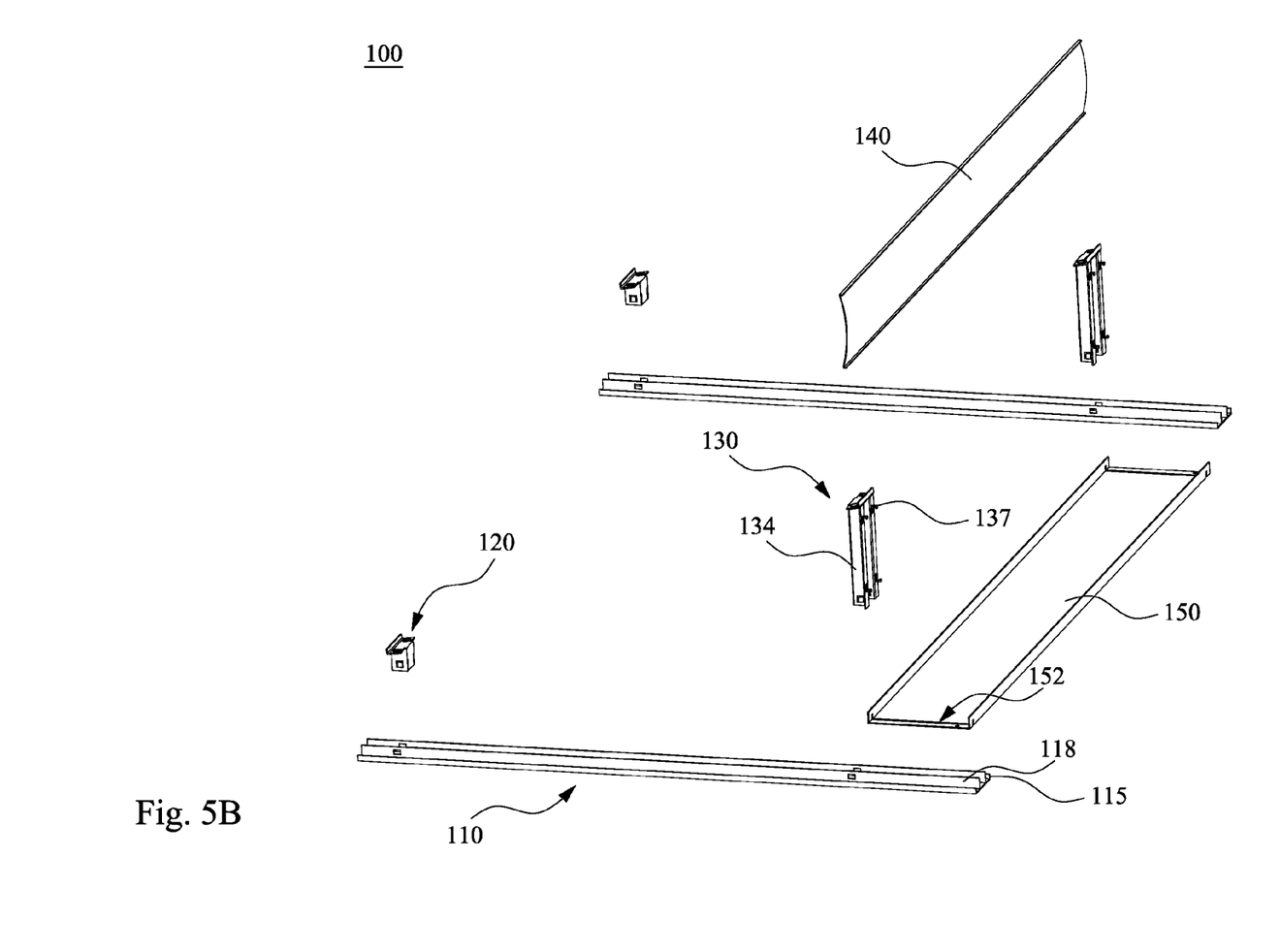

FIG. 5A and FIG. 5B are respectively a perspective view and an exploded view of a frame utilized for fixing a solar module according to another embodiment of the present invention, respectively. The difference between the present embodiment and the previous embodiment is that the frame 100 according to the present embodiment further comprises a wind deflector 140. The wind deflector 140 may be a mesh having pores and is utilized for guiding airflow so as to prevent the formation of a lifting force caused by compression of air when strong winds pass under the solar module 200 (see FIG. 1A). The second support 130 further comprises a plurality of ear-hook portions 137 disposed on the fourth connection portions 139, and the wind deflector 140 is hooked on the ear-hook portions 137.

The frame 100 may further comprise a counterweight receiving member 150. The counterweight receiving member 150 has strip holes 152 to allow the counterweight receiving member 150 to engage with the bar base 110. More specifically, the bar base 110 further comprises retaining walls 115 disposed outside the ribs 118, and the strip holes 152 fit with the retaining walls 115 of the bar base 110. The counterweight receiving member 150 may be further screw tightened on the bar base 110. The counterweight receiving member 150 is utilized for accommodating a counterweight so that the frame 100 is firmly fixed on the roof of a building or on the ground.

Since the first support and the second support are directly engaged with the bar base, no screws or other holding fixtures are necessary. Hence, the number of assembly procedures is effectively reduced to improve assembly efficiency.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A frame utilized for supporting a solar module, comprising:
   a bar base having at least two positioning holes; and
   a first support utilized for being engaged with the bar base, the first support comprising:
      two first sidewalls, each of the first sidewalls having a first opening and a first extension portion, each of the first extension portions extending from an edge of the corresponding first opening toward an interior of the first support, an angle being included between each of the first extension portions and the corresponding first sidewall; and
      a first top plate disposed on top of the first sidewalls;
      wherein each of the first extension portions is trapped in the corresponding positioning hole when the first support is engaged with the bar base, a width of the first top plate is greater than an interval between the two first sidewalls, each of two end portions of the first top plate extending beyond one of the first sidewalls has a bolt opening.

2. The frame of claim 1, wherein the first support further comprises:
   a first connection portion connected to the first sidewalls and the first top plate, the first connection portion having a plurality of first recesses, each of the first recesses being formed in the first connection portion where the first connection portion is connected to one of the first sidewalls, and the first recesses being utilized for engaging with the bar base.

3. The frame of claim 1, wherein the first top plate has an inclination angle relative to a bottom edge of each of the first sidewalls.

4. The frame of claim 1, wherein the first support further comprises a first bending portion connected to one side of the first top plate.

5. The frame of claim 1, wherein the angle between each of the first extension portions and the corresponding first sidewall is between about 5 degrees and about 30 degrees.

6. The frame of claim 1, wherein the bar base comprises:
   a bottom plate; and
   two ribs standing upright on the bottom plate, the positioning holes being formed on the ribs.

7. The frame of claim 6, further comprising:
   a second support, the second support comprising:
      a second top plate;

two second sidewalls connected to two opposite sides of a bottom of the second top plate and being utilized for supporting the second top plate, a height of the second sidewalls being greater than a height of the first sidewalls, and each of the second sidewalls having a second opening; and two second extension portions, each of the second extension portions extending from one of the second sidewalls from an edge of the corresponding second opening toward an interior of the second support, a top end of each of the second extension portions abutting against a top edge of the corresponding positioning hole when the second support is engaged with the bar base.

8. The frame of claim 7, wherein the second support further comprises:

a second connection portion connected to the second sidewalls and the second top plate, the second connection portion having a plurality of second recesses, each of the second recesses being formed in the second connection portion where the second connection portion is connected to one of the second sidewalls, and the second recesses being utilized for engaging with the bar base.

9. The frame of claim 7, wherein the second top plate has an inclination angle relative to a bottom edge of the second sidewall.

10. The frame of claim 7, wherein the second support further comprises a second bending portion connected to one side of the second top plate.

11. The frame of claim 7, wherein an angle is included between each of the second extension portions and the corresponding second sidewall, and the angle is between about 5 degrees and about 30 degrees.

12. The frame of claim 7, wherein the second support further comprises a plurality of ear-hook portions disposed on the second sidewalls, and the frame further comprises a wind deflector hooked on the ear-hook portions.

13. The frame of claim 7, wherein a width of the second top plate is greater than an interval between the two second sidewalls.

14. The frame of claim 13, wherein each of two end portions of the second top plate extending beyond the second sidewall has a bolt opening.

15. The frame of claim 1, further comprising:

a counterweight receiving member, the counterweight receiving member having a strip hole to allow the counterweight receiving member to engage with the bar base.

16. A frame utilized for supporting a solar module, comprising:

a bar base having at least two positioning holes;
a first support utilized for being engaged with the bar base, the first support comprising:
two first sidewalls, each of the first sidewalls having a first opening and a first extension portion, each of the first extension portions extending from an edge of the corresponding first opening toward an interior of the first support, an angle being included between each of the first extension portions and the corresponding first sidewall; and
a first top plate disposed on top of the first sidewalls;
wherein each of the first extension portions is trapped in the corresponding positioning hole when the first support is engaged with the bar base; and
a second support comprising:
a second top plate;
two second sidewalls connected to two opposite sides of a bottom of the second top plate and being utilized for supporting the second top plate, a height of the second sidewalls being greater than a height of the first sidewalls, and each of the second sidewalls having a second opening;
a plurality of ear-hook portions disposed on the second sidewalls;
a wind deflector hooked on the ear-hook portions; and
two second extension portions, each of the second extension portions extending from one of the second sidewalls from an edge of the corresponding second opening toward an interior of the second support, a top end of each of the second extension portions abutting against a top edge of the corresponding positioning hole when the second support is engaged with the bar base.

17. A frame utilized for supporting a solar module, comprising:

a bar base having at least two positioning holes; and
a first support utilized for being engaged with the bar base, the first support comprising:
two first sidewalls, each of the first sidewalls having a first opening and a first extension portion, each of the first extension portions extending from an edge of the corresponding first opening toward an interior of the first support, an angle being included between each of the first extension portions and the corresponding first sidewall; and
a first top plate disposed on top of the first sidewalls;
wherein each of the first extension portions is trapped in the corresponding positioning hole when the first support is engaged with the bar base;
a second support comprising:
a second top plate;
two second sidewalls connected to two opposite sides of a bottom of the second top plate and being utilized for supporting the second top plate, a height of the second sidewalls being greater than a height of the first sidewalls, and each of the second sidewalls having a second opening, wherein a width of the second top plate is greater than an interval between the two second sidewalls; and
two second extension portions, each of the second extension portions extending from one of the second sidewalls from an edge of the corresponding second opening toward an interior of the second support, a top end of each of the second extension portions abutting against a top edge of the corresponding positioning hole when the second support is engaged with the bar base.

* * * * *